(12) United States Patent
Howard et al.

(10) Patent No.: US 8,990,139 B1
(45) Date of Patent: Mar. 24, 2015

(54) FRAMEWORK FOR FLEXIBLE COGNITIVE PERCEPTION AND ACTION SELECTION

(75) Inventors: Mike Howard, Westlake Village, CA (US); Rajan Bhattacharyya, Sherman Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 297 days.

(21) Appl. No.: 13/556,014

(22) Filed: Jul. 23, 2012

(51) Int. Cl.
    *G06F 17/00* (2006.01)
    *G06N 5/02* (2006.01)
    *G06Q 10/10* (2012.01)

(52) U.S. Cl.
    CPC .................... *G06Q 10/101* (2013.01)
    USPC .......................................................... 706/46

(58) Field of Classification Search
    None
    See application file for complete search history.

(56) References Cited

U.S. PATENT DOCUMENTS

| | | | |
|---|---|---|---|
| 5,276,774 A | 1/1994 | Orihara et al. | |
| 5,659,666 A | 8/1997 | Thaler | |
| 7,599,902 B2 | 10/2009 | Fox et al. | |
| 8,346,391 B1 * | 1/2013 | Anhalt et al. | 700/248 |
| 2004/0143417 A1 * | 7/2004 | Hedlund et al. | 702/183 |

OTHER PUBLICATIONS

Salamo et al. "Quality Enhancement Based on Reinforcement Learning and Feature Weighting for a Critiquing-Based Recommender", ICCBR 2009, pp. 298-312.*

Case-Based Reasoning, lecture, 2004, pp. 6.*

Mike Daily, Jerry Isdale, Howard Neely, and Julius Bogdanowicz. Performance analysis of a cognitive analogical reasoner. In Proceedings of 2008 IEEE Aerospace Conference, 2008, pp 1-8.

Lior Elazary and Laurent Itti. Interesting objects are visually salient. Journal of Vision, 8 (3):1-15, 2008. doi: 10.1167/8.3.3.

Dedre Gentner. Structure-mapping: A theoretical framework for analogy. Cognitive Science, 7: 155-170, 1983. Reprinted in A. Collins & E. E. Smith (Eds.), Readings in cognitive science: A perspective from psychology and artificial intelligence, Palo Alto, CA: Kaufmann.

Robert Hecht-Nielsen. Cogent confabulation. Neural Networks, 18: 111-115, 2005.

J. E. Hummel and K. J. Holyoak. Distributed representations of structure: A theory of analogical access and mapping. Psychological Review:, 104, 427-466, 1997.

J. E. Hummel and K. J. Holyoak, A symbolic connectionist theory of relational inference and generalization. Psychological Review, 110: 220-263, 2003.

Ozlem Kalinli and Shrikanth Narayanan. A saliency-based auditory attention model with applications to unsupervised prominent syllable detection in speech. In Interspeech, 2007. www.//-sail.usc.edu/-publications/-ozlem_icslp07.pdf.

(Continued)

*Primary Examiner* — Li-Wu Chang
(74) *Attorney, Agent, or Firm* — Tope-McKay & Associates

(57) ABSTRACT

Described is a system for flexible cognitive perception and selection. A pre-processing recognition module filters and tags input data from an environment resulting in a tagged percept. The tagged percept is stored and associated with a knowledge frame by a memory module based on shared descriptors, resulting in an activated knowledge frame. A utility rating is then supplied to each activated knowledge frame based on a set of reward values by an evaluation module. The activated knowledge frames are sorted, compared, and evaluated for a goodness of fit between the utility ratings of the activated knowledge frames and the input data by a hypothesis module. A best hypothesis for a current situation in the environment is determined based on a current highest rated activated knowledge frame.

13 Claims, 12 Drawing Sheets

(56) References Cited

OTHER PUBLICATIONS

Melanie Mitchell. Copycat: A Computer Model of High-Level Perception and Conceptual Slippage in Analogy-Making. Computer Science, . Ph.D., University of Michigan, 1990.

Randall C O'Reilly Seth A Herd, and Wolfgang M Pauli. Computational models of cognitive control. Current opinion in neurobiology, 20: 257-261, Feb. 2010, doi: 10.1016/j.conb.2010.01.008. www.ncbi.nlm.nih.gov/-pubmed/-20185294.

Thomas Serre, Lior Wolf, Stanley Bileschi, Maximilian Riesenhuber, and Tomaso Poggio. Robust object recognition with cortex-like mechanisms. IEEE Transactions on Pattern Analysis and Machine Intelligence, 29: 411-426, 2007. doi: 10.1.173.6481. www.//-cbcl.mit.edu/-publications/-ps/-serre-wolf-poggio-PAMI-07.pdf.

A.G.Hanlon in "Content-Addressable and Associative Memory Systems: A Survey", IEEE Transactions on Electronic Computer, vol. EC-15, No. 4, Aug. 1966, pp. 509-521.

Troussov et al. In "Spreading Activation Methods", in Dynamic and Advanced Data Mining for Progressing Technological Development: Innovations and Systemic Approaches, Chapter 8, pp. 136-167, 2010.

* cited by examiner

FRAMEWORK FOR FLEXIBLE COGNITIVE PERCEPTION AND ACTION SELECTION

BACKGROUND OF THE INVENTION (1) Field of Invention

The present invention relates to a system for flexible cognitive perception and action selection and, more particularly, to a system for flexible cognitive perception and action selection which uses distributed representations of multiple hypotheses to interpret perceptual information in an unfamiliar environment.

(2) Description of Related Art

A machine is considered intelligent if it can perceive its environment and take actions that maximize its chance of success at achieving goals. Several systems exist that perceive an environment and assess a situation. For instance, intelligence systems and security systems report an estimate of a situation if it meets or exceeds certain criteria. Additionally, robotic systems use estimates to select actions or plans. However, it is very difficult to program such systems to recognize and understand a non-stationary environment. Fuzzy networks can make a fuzzy match to the closest known situation or situations, however, inefficiencies still exist.

In "Copycat: A Computer Model of High-Level Perception and Conceptual Slippage in Analogy-Making", Computer Science, 1990, Mitchell builds conceptual (semantic) hierarchies on input data in a process loosely related to perception in the visual cortex. Competing hypotheses are built in parallel, and a form of simulated annealing is used to eliminate the weaker ones. There is no learning involved; rather, a population of elements of an interpretation is designed a priori, along with a set of hypotheses. The simulated annealing technique is critical for deciding when a solution has been reached and for deciding which hypotheses survive, but it depends heavily on a "temperature" control mechanism, which has only been designed for a very limited domain. The system does not interact with the environment to evaluate potential solutions.

In "Distributed Representations of Structure: A Theory of Analogical Access and Mapping", Psychological Review, 104: 427-466, 1997 and in "A Symbolic Connectionist Theory of Relational Interference and Generalization", Psychological Review, 110: 220-263, 2003, Hummel and Holyoak describe a network pattern-matcher, which matches inputs to hand-built ontological descriptions. Ontology building is difficult, time-consuming, and hard to automate. In their papers, Hummel and Holyoak present a signaling system to find and retrieve relevant stored patterns based on temporal signals describing features of the input data, which would be impractical for sufficiently complex inputs. Furthermore, there is no way to compare different patterns in parallel or compute them directly. Instead, they must be done sequentially and some metric must be stored for comparison.

Additionally, Gentner finds similarities between semantic hierarchies by structural similarity using an analogical reasoner in "Structure-Mapping: A Theoretical Framework for Analogy", Cognitive Science, 7: 155-170, 1983. The reasoner is a pattern matcher, and cannot learn new structures.

Finally, U.S. Pat. No. 5,659,666, entitled, "Device for the Autonomous Generation of Useful Information" issued to Thaler discloses a neural network device for simulating human creativity. An Imagination Engine (IE) net is trained to produce input/output (I/O) maps in some predetermined knowledge domain, and there is a way to perturb the IE to change the I/O mapping. However, Thaler does not disclose a mechanism for ensuring that the new I/O mapping is internally consistent, other than testing the randomly generated mappings. His approach does not use or take into account the hierarchical structure of knowledge.

Thus, a continuing need exists for a system that can learn features of an unfamiliar environment, adapt readily to non-stationary environments, and adjust to different domains without much reprogramming, all while taking into account the hierarchical structure of knowledge.

SUMMARY OF THE INVENTION

The present invention relates to a system for flexible cognitive perception and action selection. The system comprises one or more processors and a non-volatile memory having instructions such that when the instructions are executed, the one or more processors perform operations of filtering and tagging of input data from an external environment by a pre-processing recognition module, resulting in at least one tagged percept. The at least one tagged percept is stored and associated with at least one knowledge frame based on shared descriptors between the at least one tagged percept and the knowledge frame by a non-volatile memory module, resulting in an activated knowledge frame. A utility rating is supplied to each activated knowledge frame based on a set of reward values by an evaluation module. The activated knowledge frames are sorted, compared, and evaluated for a goodness of fit between the utility ratings of the activated knowledge frames and the input data by a hypothesis module. A best hypothesis is finally determined for a current situation in the external environment based on a current highest rated activated knowledge frame.

In another aspect, the pre-processing recognition module performs operations of extracting and identifying a set of salient features in the input data, filtering the set of salient features for relevancy based on similarity to the current highest rated activated knowledge frame, and semantically tagging percepts.

In another aspect, a knowledge frame in the memory module is an associative structure comprised of a set of bits that represents salient features of an experience, wherein each bit is associated with a hierarchy of semantic descriptors and related bits.

In another aspect, the hypothesis module comprises a set of registers each containing at least one activated knowledge frame from the memory module, wherein each register has an associated utility rating.

In another aspect, the hypothesis module further performs operations of sorting the set of registers based on each register's associated utility rating and re-evaluating the current highest rated activated knowledge frame when the set of registers is updated.

In another aspect, the evaluation module further performs operations of receiving a set of feedback from the external environment and determining the utility rating for each activated knowledge frame based on a reward value that is based on how successful a hypothesis is for accomplishing a goal of the system.

As can be appreciated by one in the art, the present invention also comprises a method for causing a processor to perform the operations described herein.

Finally, the present invention also comprises a computer program product comprising computer-readable instruction means stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
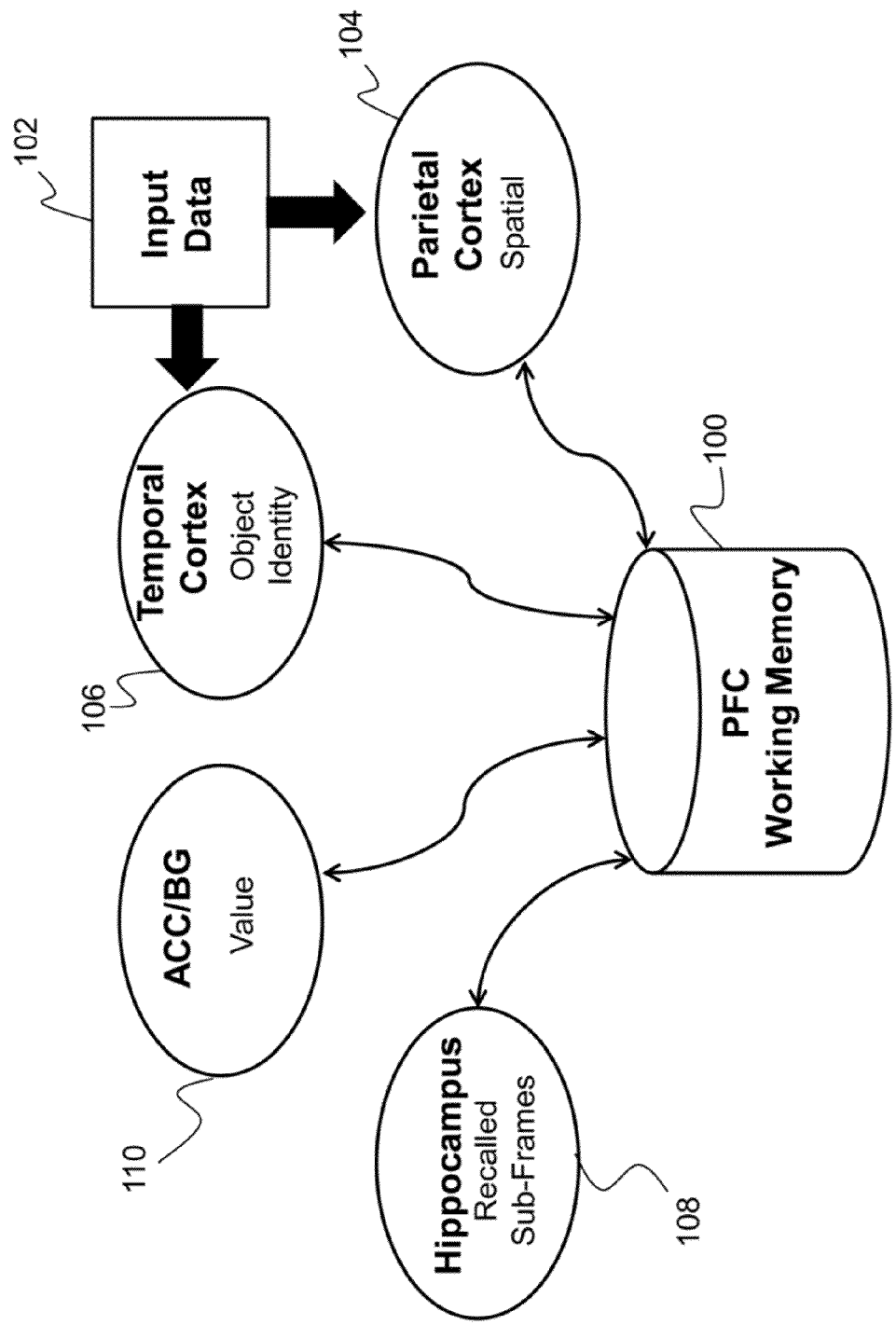
FIG. 1 is a diagram of the links between the prefrontal cortex and other regions of the brain according to the present invention.

The present invention relates to a system for flexible cognitive perception and action selection and, more particularly, to a system for flexible cognitive perception and action selection, which uses distributed representations of multiple hypotheses to interpret perceptual information in an unfamiliar environment. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the preSent invention is not intended to be limited to the embodiments presented, but is to be accorded with the widest scope consistent with the principles and novel features disclosed herein.

In the following detailed description, numerous specific details are set forth in order to provide a more thorough understanding of the present invention.

However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

(1) Principal Aspects

The present invention has three "principal" aspects. The first is a system for flexible cognitive perception and action selection. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for flexible cognitive perception and action selection, typically in the form of software, operated using a data processing system (computer or computer network). The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the non-volatile memory of a computer or on a non-transitory computer-readable medium such as a floppy disk, a CD-ROM, and a flash drive.

(2) Introduction

Humans understand the world by learning salient features and how they work together, especially in relation to their goals. A percept is a perceived form of external stimuli or its absence. In the field of artificial intelligence, a percept is the input that an intelligent agent is perceiving, at any given moment. When two or more percepts are found to be present and related to goal achievement, the association is learned as a higher level feature. This association between percepts and some related action or goal is known as a knowledge frame in artificial intelligence. Knowledge frames can be combined to form larger hierarchical frames. In the present application, it is posited that the brain makes sense of the world in terms of past experiences. The brain mechanisms that can access the most applicable memories (or knowledge frames) and adapt them as necessary to achieve goals are a signature of intelligence. These brain mechanisms are the inspiration for the invention described herein.

In the brain, knowledge frames are learned in several regions, but task-relevant frames are linked together in the prefrontal cortex (PFC) 100 working memory, as illustrated in FIG. 1. Sensory input data 102 activate spatial representations in the parietal cortex 104 and the semantic representations (or object identity) in the temporal cortex 106, which in turn excite related memories in the medial temporal lobe and hippocampus 108. A particular set of percepts can excite multiple representations in each of these areas, so an arbiter is required to evaluate and find a consistent set that best explains the situation and can help achieve goals. That arbiter is the PFC 100, which has strong bi-directional links into each of the other regions. Arbitration is based on a value assigned by the ACC/BG (anterior cingulated cortex/basal ganglia) 110.

In the present application, it is set forth that microcircuits in the PFC called "stripes" hold the links to the various parts of the distributed representation of each knowledge frame that is excited by input stimuli and may be task relevant. Further, only a single knowledge frame that seems most relevant at any particular time drives the attentional and motor facilities in the brain. Several knowledge frames may be active at any time, and some of these are likely to overlap since they refer to the same sensory inputs. For instance, if there is no doubt that one of the objects in a situation is a basketball, every hypothesis about the current situation might link to it. However, the best interpretation of the current situation can change dynamically; it is a winner-take-all among the current knowledge frames, or hypotheses in working memory. The most relevant knowledge frame is evaluated moment to moment based on how its predictions match expected results.

The above describes a technique for how knowledge frames are learned and modified. Common elements that keep appearing together build associations to each other through experience. The features of a hypothesis that help explain or exploit a situation the best are the ones that are reinforced and learned. Features that occur only incidentally, but are not helpful for explaining or exploiting a situation, are not reinforced and become disassociated.

(3) Specific Details

The present invention describes a sense-making mechanism that adds flexibility to a system's ability to interpret sensory/perceptual information. The sense-making mechanism emulates some aspects of human creativity, in particular, analogy making. The method described herein is based on theories of the structure and function of the executive regions of the mammalian brain, including the prefrontal cortex (PFC), medial temporal lobe, and related regions. The method emulates the mechanism by which humans and higher mammals are able to understand and figure out how to act reasonably, even in very unfamiliar situations, by flexibly combining hypotheses from related situations. The method can also be used in a system to interpret or predict the consequence of an action. This is especially advantageous in temporal sequences, because often events may be observed in a different order which would affect the relationship between the events (i.e., causaVnoncausal). Being able to flexibly combine/learn hypotheses, rather than trying to learn and store all possible combinations of events, is critical to planning.

Figure 2:
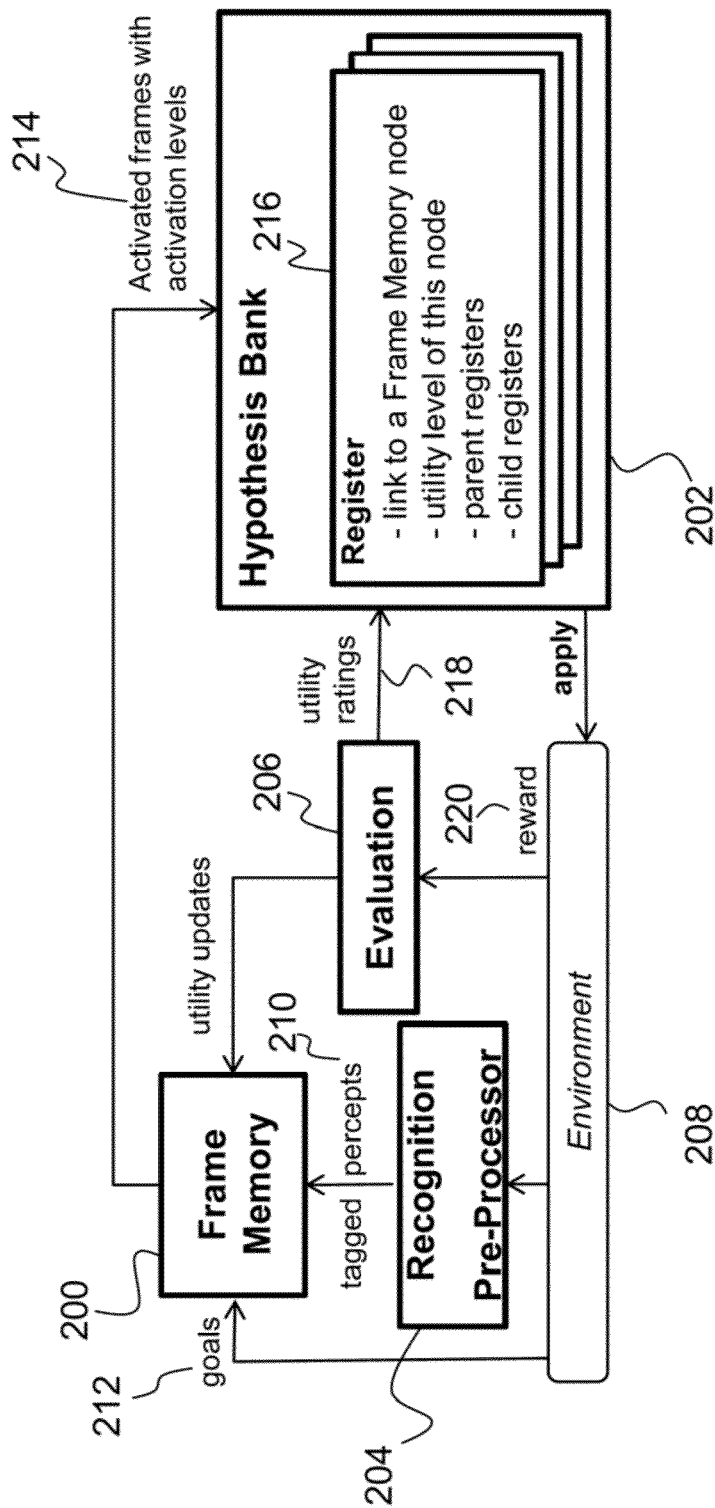
FIG. 2 is a flow diagram of the system for flexible cognitive perception and action selection according to the present invention.

As shown in FIG. 2, the invention consists of four main modules: a non-volatile frame memory module 200, a hypothesis module (hypothesis bank 202), a recognition preprocessor module 204, and an evaluation module 206. The invention described herein is conceived as an infinite loop continually sensing and evaluating a situation and acting on the best evaluation by interacting with the environment 208. Actions include active or passive sensing of physical interaction with the environment 208. A non-stationary environment 208 is assumed and at least a sensing apparatus that senses the environment 208 and reports percepts to the recognition preprocessor module 204, a non-limiting example of which includes a sensor, such as a camera. Tagged percepts 210, which are percepts that have been recognized and tagged as being related to a highly rated knowledge frame in the hypothesis bank 202, are sent to the frame memory module 200. The frame memory module 200 is an associative content-addressable memory, as is known in the art and such as was surveyed by A. G. Hanlon in "Content-Addressable and Associative Memory Systems: A Survey", IEEE Transactions on Electronic Computers, Vol. EC-15, No. 4, Aug. 1966, which is hereby incorporated by reference as though fully set forth herein. The frame memory module 200 stores learned knowledge frames. A frame link learning module, which is described in detail below, is a related module that can update the strength of links or learn new links between concepts in the frame memory module 200.

The frame memory module 200 also receives goals 212 from the environment 208. The frame memory module 200 then sends activated knowledge frames with their activation levels 214 to the hypothesis bank 202 to be stored as active hypotheses. The active hypotheses are hypotheses retrieved from the frame memory module 200, because they contain features activated by percepts in the current situation. The hypothesis bank 202 comprises at least one register 216. The register 208 contains information regarding a link to a knowledge frame from the frame memory module 200, utility level of the node (knowledge frame), and the address of other registers in the frame memory module 200 that link to parent and child nodes. The utility level of a node is based on goodness of fit to the incoming data from the environment 208. In other words, the closer the active node (hypothesis/knowledge frame) is to the incoming external data, the higher the utility level of the node. A utility rating (level) is associated with each register 216 in the hypothesis bank 202. When a register 216 is filled, it is set initially to the activation level of the frame node in the frame memory module 200, but the evaluation module 206 may subsequently update it.

The evaluation module 206 supplies utility ratings 218 to the knowledge frames linked into registers 216 in the hypothesis bank 202. The evaluation module 206 recomputes utility ratings 218 for registers 216 that hold references to the single most highly rated frame active in the hypothesis bank 202 separately, based on how well it seems to have performed. Additionally, the evaluation module 206 receives feedback from the environment 208, in terms of a reward 220 for how successful a given hypothesis is for accomplishing the goals 212 of the external system into which the inventive system is embedded. The recognition pre-processor 204 identifies salient features in the sensed environment 208 that are linked into the registers 216 in the hypothesis bank 202 with the highest utilities. The hypothesis bank 216 is where activated knowledge frames, stimulated by tagged percepts 210 from the recognition pre-processor module 204, are sorted out, compared, and evaluated for goodness of fit with the current situation. Knowledge frames linked into the hypothesis bank 216 are called hypotheses because they are competing explanations for the current situation. Each of the processes above will be described in further detail below.

Figure 3:
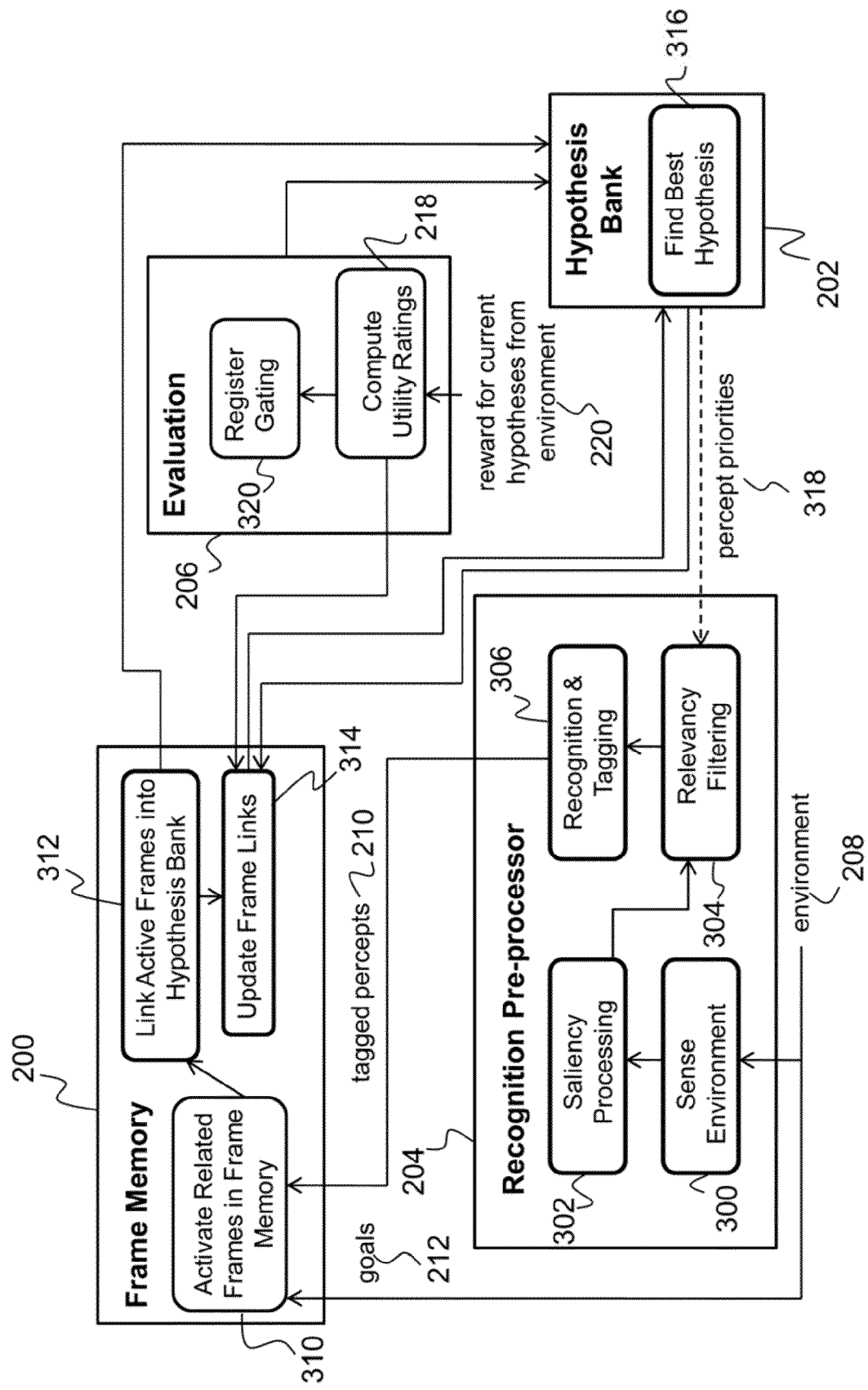
FIG. 3 is a detailed flow diagram of the system for flexible cognitive perception and action selection according to the present invention.

FIG. 3 is a detailed diagram of the functions of the system described herein. The recognition pre-processor module 204 filters and tags input data in several steps. First, a sense environment 300 process extracts features from the world (i.e., environment 208). Second, a bottom-up saliency processing 302 process identifies salient features in the sensor data. In this context, saliency is purely based on surprise, and not goals or motivations. For instance, the surprise could be a color, movement, or sound that makes something stand out. Third, the salient features are then filtered for relevancy for the current situation in a relevancy filtering process 304, based on the current best hypothesis (or N number of top hypotheses, depending on the application). Relevant features are salient features that are most closely related to the currently highest rated frame in the hypothesis bank 202. The relevant features are priorities for sensing. Finally, each of the surviving (or remaining) percepts undergoes a recognition and tagging 306 process. Visual recognition systems exist in the prior art that can find salient objects in a sensor view, and return class labels for them, such as described in "Robust Object Recognition with Cortex-Like Mechanisms" by Serre et al. in IEEE Transactions on Pattern Analysis and Machine Intelligence, 29: 411-426, 2007, which is hereby incorporated by reference as though fully set forth herein. Such systems may return a variety of possibly conflicting tags for each object so recognized, and they do not necessarily attempt to make an overall consistent interpretation of a scene so that object labels are mutually consistent. That is an important deficit in the prior art that the present invention addresses.

The recognition pre-processor module 204 submits these pre-processed percepts (tagged percepts 210) to the frame memory module 200, where the tagged percepts 210 may stimulate one or more existing knowledge frames (by virtue of shared descriptors), in addition to themselves, each with stored associations. In other words, the tagged percepts 210 from the recognition pre-processor 204 activate related knowledge frames 310 in the frame memory module 200.

Figure 4:
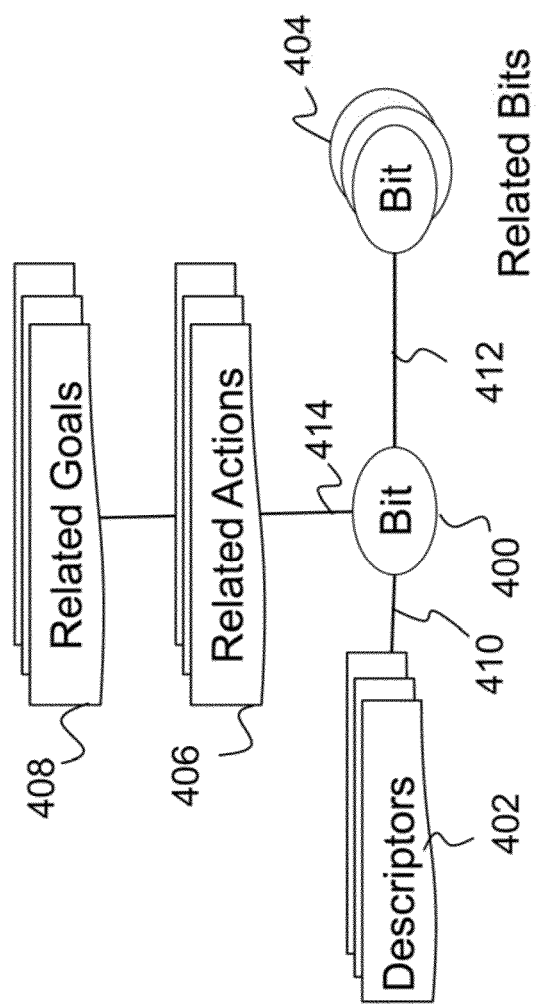
FIG. 4 is a diagram of a knowledge frame and its associative structure according to the present invention.

FIG. 4 illustrates the associative structure of knowledge frames stored within the frame memory module. A knowledge frame in the frame memory module is an associative structure composed of scraps of experience called bits 400. A bit 400 is a memory of a percept; it represents atomic salient features of experience. Each bit 400 is associated with a hierarchy of semantic descriptors 402 for features of the item, as well as relationship links. Each bit 400 may be associated with multiple descriptors 402 and linked to related bits 404. Given a semantic query (in the form of either semantically tagged percepts or goals), it activates all memories associated with those semantic tags. Such a memory can be implemented using a spreading activation mechanism, such as described by Troussov et al. in "Spreading Activation Methods", in Dynamic and Advanced Data Mining for Progressing Technological Development: Innovations and Systemic Approaches, Chapter 8, pp. 136-167, 2010, which is hereby incorporated as though fully set forth herein. In the Troussov et al. reference, the query gives an activation level to the semantic concepts in the query and that energy spreads along association links, attenuated somewhat with each link it crosses. Each activated bit 400, and its related actions 406 and related goals 408, is linked into registers in the hypothesis bank, with the levels of activation as initial utilities.

There are several kinds of associative links in a knowledge frame. First, there are descriptor links 410 between bits 400 and semantic descriptors 402, which may form a hierarchical set. The descriptor links 410 are provided to the frame memory module by the recognition pre-processor module. Second, there are related links 412 between bits representing percepts that were perceived together (related bits 404). The related links 412 are stronger if there was any evidence that they were acting together, moving together, or responding to each other in some way. The related links 412 are added by the frame memory module the first time two things are perceived together and are reinforced by the frame link learning module if the evaluation module finds that their mutual presence makes the frame better at interpreting the situation. The third type consists of links 414 between bits 400 and related actions 406 and related goals 408. In one aspect, the groups may be a hierarchical set.

Referring back to FIG. 3, each active knowledge frame in the frame memory module 200 becomes associated non-exclusively with multiple bits and multiple goals and linked into the hypothesis bank 202 through a process which links active frames into the hypothesis bank 312 (frame link learning module). These hierarchies are learned in an update frame links process 314 when the evaluation module 206 receives an external signal that indicates that the top-rated frame in the hypothesis bank 202 has explained a situation well enough that an action based on that situation was successful (reward for current hypotheses from environment 220). Each active knowledge frame in the hypothesis bank 202 is a copy of active nodes in the frame memory module 200, linked together into an associative structure, as depicted in FIG. 4, which best explains the situation. Thus, the update frame links process 314 strengthens the association in the frame memory module 200 between those structures that worked well together to explain the current situation. Therefore, in the future, it is more likely the structures will be retrieved together. For ever link in the top-rated frame in the hypothesis bank 202, the strength of the related link is increased in the frame memory module 200 through the update frame links process 314. Additionally, register gating 320 controls locks on each register in the hypothesis bank 202, thereby controlling whether the contents of a register are protected or allowed to be overwritten by new values, which is described in further detail below.

Figures 5A, 5B:
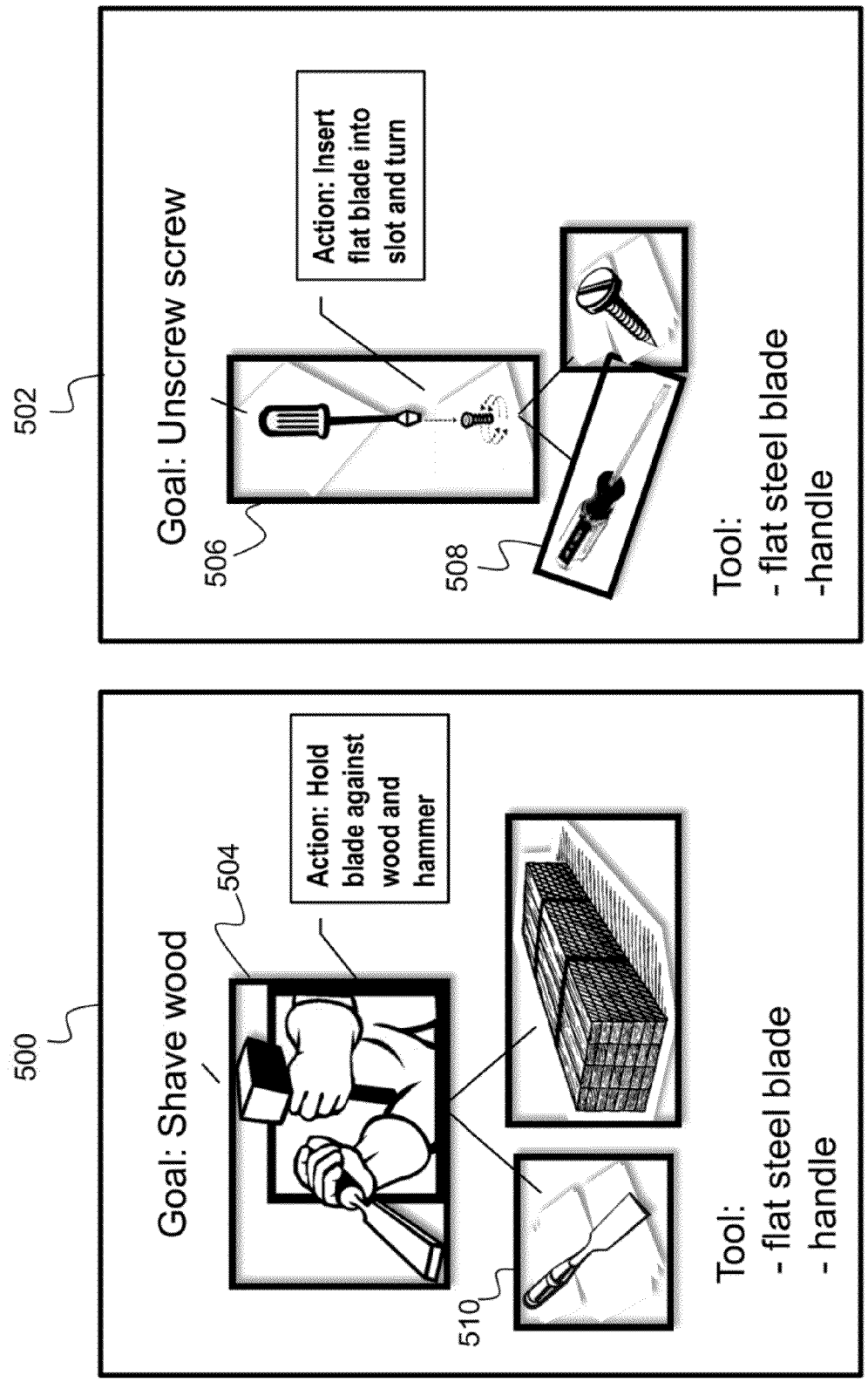
FIG. 5A is an illustration of a chiseling knowledge frame according to the present invention.
FIG. 5B is an illustration of an unscrewing knowledge frame according to the present invention.

FIGS. 5A and 5B illustrate fragments of two knowledge frames, a chiseling knowledge frame 500 and an unscrewing knowledge frame 502, respectively, that might appear in the frame memory module. FIG. 5A illustrates an action for chiseling wood with a chisel, which supports a goal of "shave wood" 504 which is defined by a network of semantic tags. FIG. 5B illustrates an action of for unscrewing a screw with a screwdriver, which supports a "unscrew screw" goal 506. Either the chiseling knowledge frame 500 or the unscrewing knowledge frame 502 can be activated in memory if any of their semantic tags match a goal asserted from the environment, or percepts supplied by the recognition pre-processor module. For example, if the "unscrew screw" goal 506 is asserted, a linked screwdriver node 508 is activated, which will activate its semantic tags such as "tool" and "flat blade", and they will spread activation (at a reduced level) to a chisel node 510, which also has a flat steel blade.

In a real world application, there may be several things going on at once in the environment at any given time, which could activate many memories all linked into the hypothesis bank registers at once. The memories could be complex, multi-node frames. This could activate frames that may have never been previously co-activated. The hypothesis bank is a dynamic scratch memory with but one main process: each time changes are made to the registers of the hypothesis bank, it must re-evaluate the highest rated hypothesis. The highest rated hypothesis will be the single best explanation for the situation, and will drive the next actions.

To find the best hypothesis, the registers are first sorted by utility. Then, starting with the highest rated register, the register is marked with a hypothesis number, and processes are initiated that follow the parent links and child links of that node, marking each node encountered along the way and adding their utility levels to a sum. There are many ways this might be done. As a non-limiting example, a full tree traversal can be performed which will mark a node only once for each hypothesis it is part of. Utility sums for each hypothesis are averaged by the number of nodes, and that average is the basis for choosing the best hypothesis (i.e., highest average utility score). When one hypothesis has been traversed in this way, the next hypothesis is found by choosing the next highest rated register that has not been marked by any hypothesis. Alternative embodiments for the best hypothesis metric would include functions that take into account the history of utility ratings for a node, or multiplicative functions.

Figure 6:
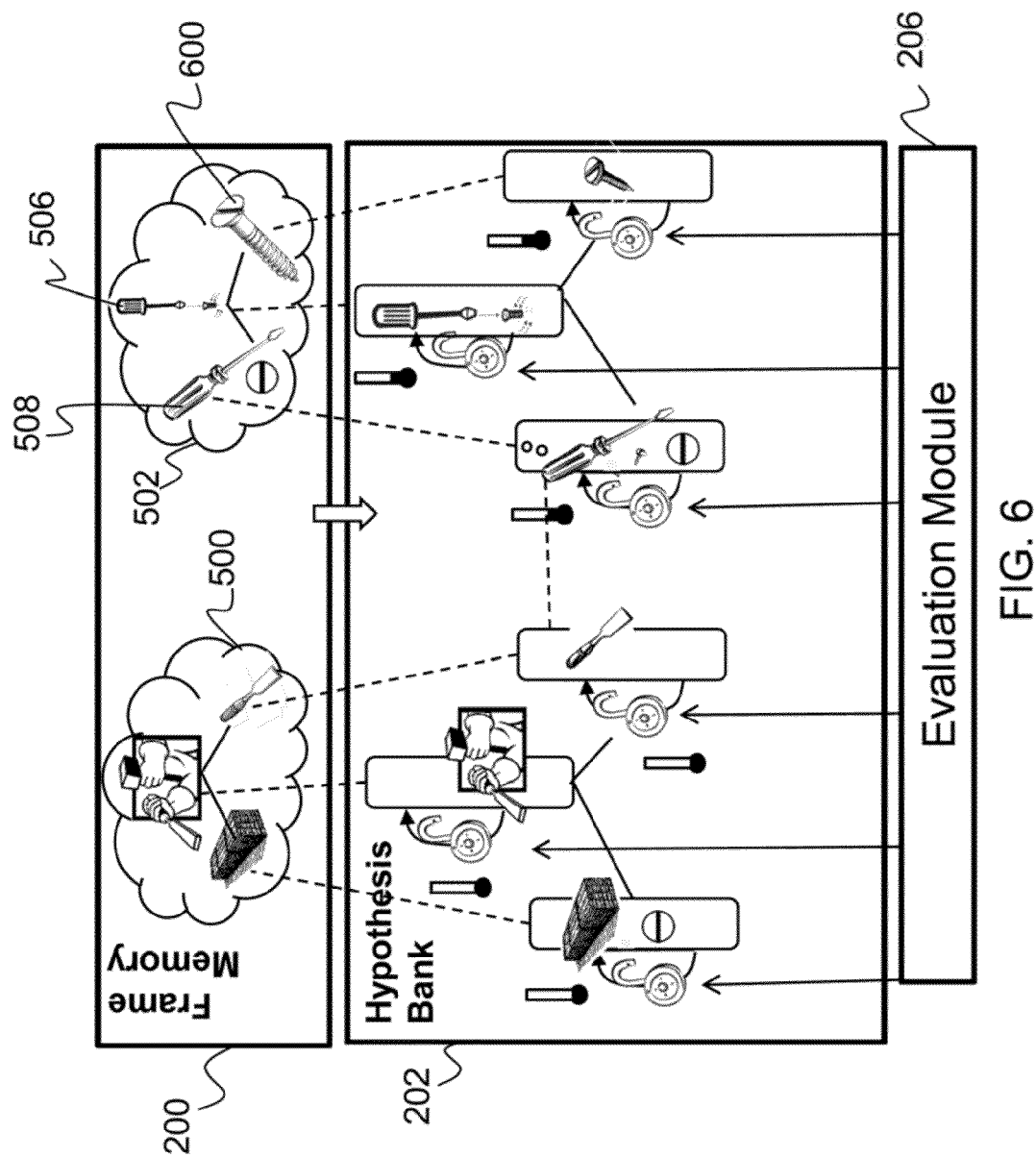
FIG. 6 is an illustration of a first part of an example scenario of the system for flexible cognitive perception and action selection according to the present invention.

FIG. 6 depicts a non-limiting example of a scenario which illustrates the concept of the present invention using the chiseling knowledge frame 500 and the unscrewing knowledge frame 502 depicted in FIGS. 5A and 5B. In this example, the goal to unscrew a screw has been asserted in the system. The mechanism for asserting the goal is analogous to the mechanism by which percepts are asserted from the recognition pre-processor module, by stimulating any memories that have tags linked to a goal of that type. The goal stimulates a knowledge frame in the frame memory module 200 due to its connection to the goal tag. The knowledge frame 502 includes a flat-blade screwdriver 508, a slotted screw 600, and an associated goal state of the screw being unscrewed 506. Activation of the unscrewing knowledge frame 502 causes secondary activation of the chiseling knowledge frame 500 at a very low level, through descriptors for the screwdriver 508 that says it is a tool with a flat blade.

Continuing with FIG. 6, each element of both the chiseling knowledge frame 500 and the unscrewing knowledge frame 502 is linked into registers in the hypothesis bank 202 (i.e., the addresses of each node of the knowledge frame is stored into a register in the hypothesis bank 202). For simplicity, it is assumed that nothing has been sensed yet, and only two knowledge frames are activated by the goal. However, as can be appreciated by one skilled in the art, any number of knowledge frames could be activated depending on the inputs and the size of the memory. In the absence of matching percepts, the evaluation module 206 rates every element in the hypothesis bank 202 with a low utility (i.e., that of the activation level in the frame memory) as indicated by the thermometers.

Figure 7:
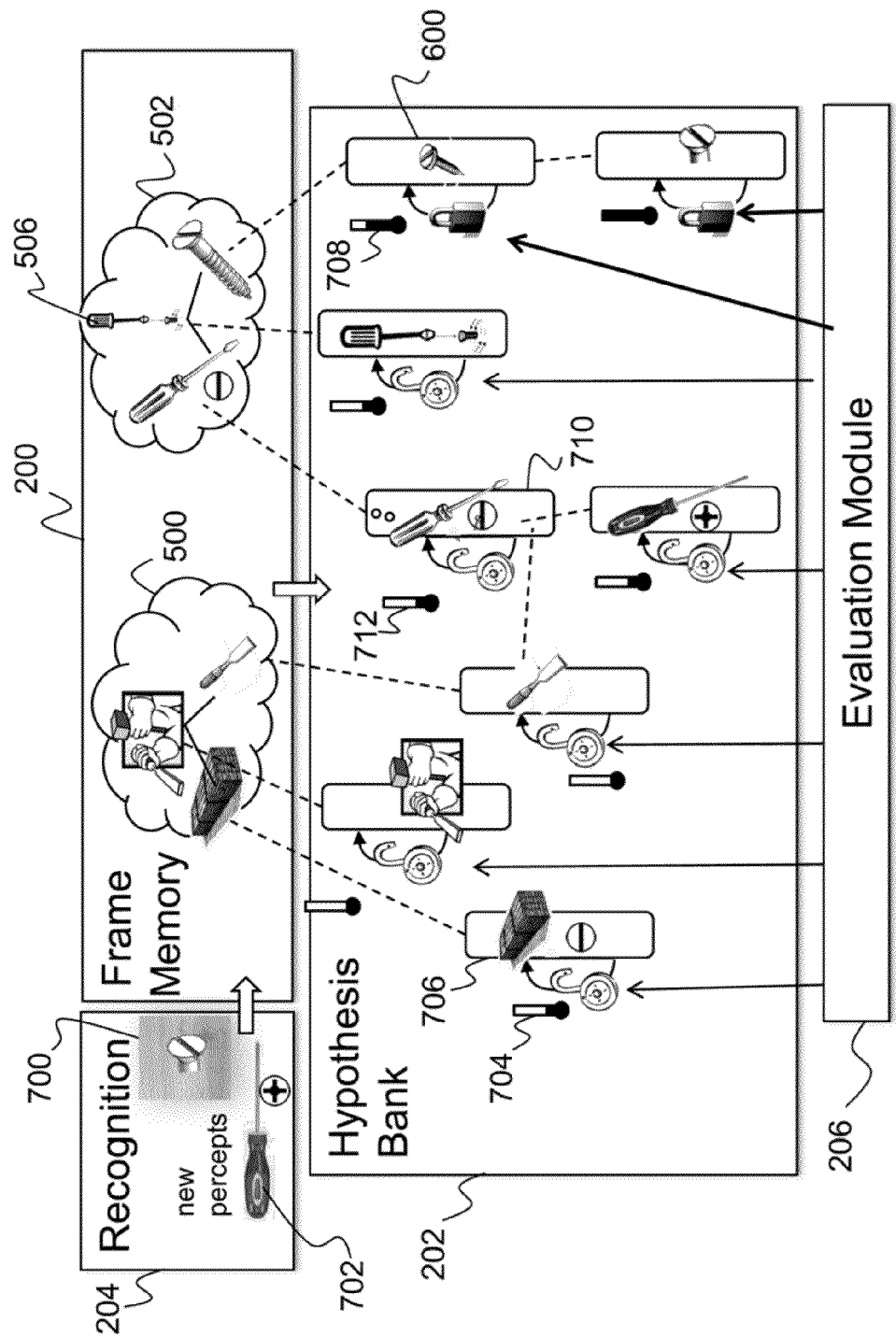
FIG. 7 is an illustration of a second part of an example scenario of the system for flexible cognitive perception and action selection according to the present invention.

In FIG. 7 a screw percept 700 is recognized by the recognition pre-processor module 204 in wood, with a descriptor that it is a slotted type screw. Also, a Phillips head screwdriver 702 percept is sensed. When these percepts 700 and 702 are asserted in the frame memory module 200, their descriptors match with the unscrew a screw 506 node in the unscrewing knowledge frame 502, so they are activated and linked into registers in the hypothesis bank 202. The evaluation module 206 supplies utility ratings to the knowledge frames linked into registers in the hypothesis bank 202. The evaluation module 206 raises the utility rating 704 on the wood part 706 of the chiseling knowledge frame 500, and the utility rating 708 of the screw part 600 of the unscrewing knowledge frame 502, but it finds the Phillips head screwdriver 702 a poor match for the required flat-blade screwdriver 710 of the unscrewing knowledge frame. 502, so it keeps that utility rating 712 low. Because the screwdriver and screw have high utility, the evaluator module can now rate the goal node of unscrewing the screw with high utility.

Figure 8:
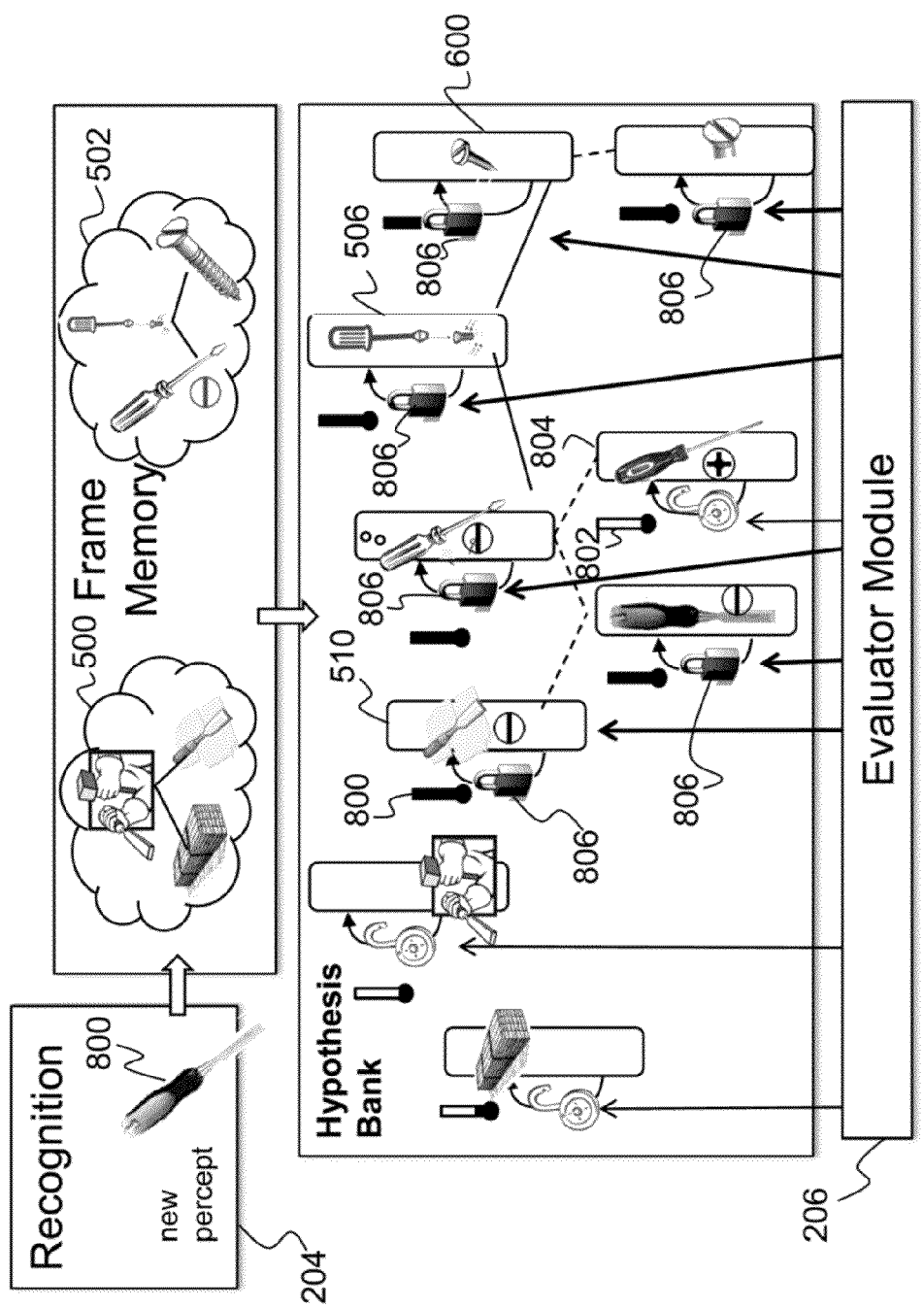
FIG. 8 is an illustration of a third part of an example scenario of the system for flexible cognitive perception and action selection according to the present invent ion.

In FIG. 8 the recognition pre-processor module 204 has sensed a chisel 800 percept that matches with the chisel node 510 of the chiseling knowledge frame 500. It can be imagined that the descriptors of the chisel 800 percept include the fact that it is a tool, and has a flat, elongated blade. It has not found a flat-head screwdriver, but the unscrewing knowledge frame 502 has the highest utility since it matches both the goal of unscrewing a screw 506 and the screw 600. Now the evaluation module 206 raises the chisel node 510 utility rating 800 higher than the utility rating 802 of the Phillips head screwdriver node 804 because it matches two knowledge frames. The utility rating 802 is depicted as a filled or unfilled icon, wherein the more filled the icon is, the greater the utility rating. The unscrewing knowledge frame 502 is now complete and is locked in, as depicted by locked locks 806, and given the highest rating. This is discovered in the "find best hypothesis" process (FIG. 3, 316), which sorts registers by utility, and will be described in further detail below. In FIG. 8, a new percept from the recognition pre-processor module for a chisel has descriptors that, possibly with low activation values, match the screwdriver node of the goal in the frame memory module. It can be imagined that its descriptors include the fact that it is a tool, and has a flat, elongated blade. Activation of this percept causes it to be linked into a hypothesis bank register where the evaluator module gives it a much better utility rating because it is a tool with a handle and a flat blade that will fit into the slot of the screw. Because the screwdriver and screw have high utility, the evaluator module can now rate the goal node of unscrewing the screw with high utility.

Figure 9B:
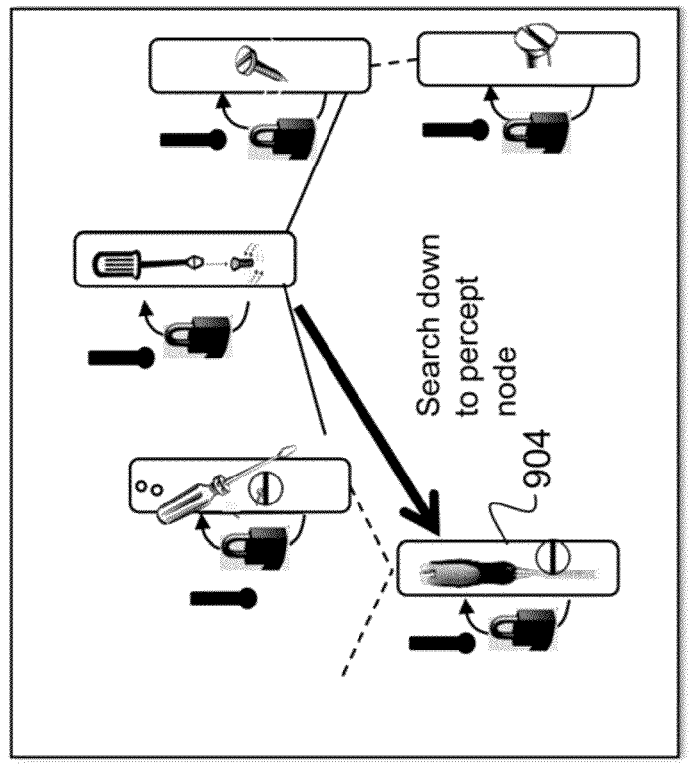
FIG. 9B is an illustration of a second search for the best hypothesis according to the present invention.
Figure 9A:
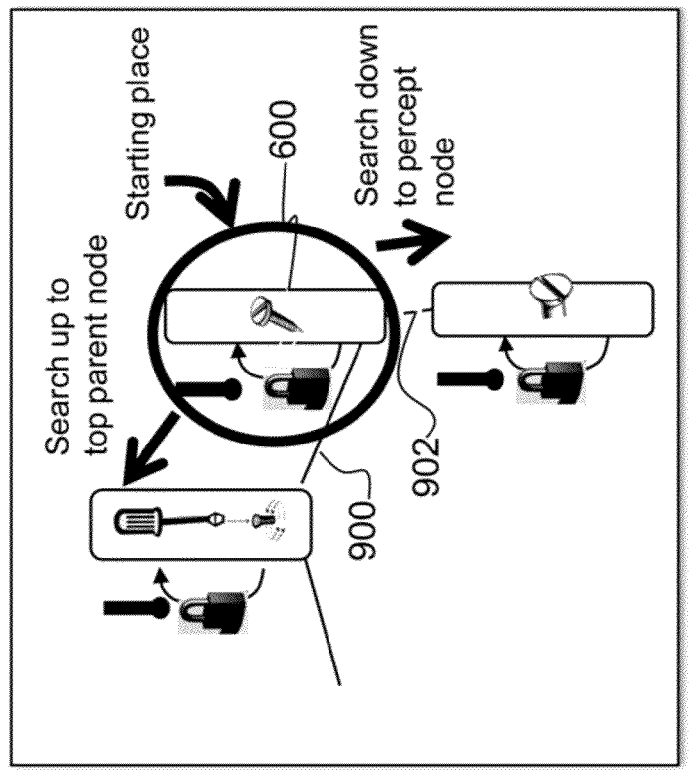
FIG. 9A is an illustration of a first search for the best hypothesis according to the present invention.
Figure 10:
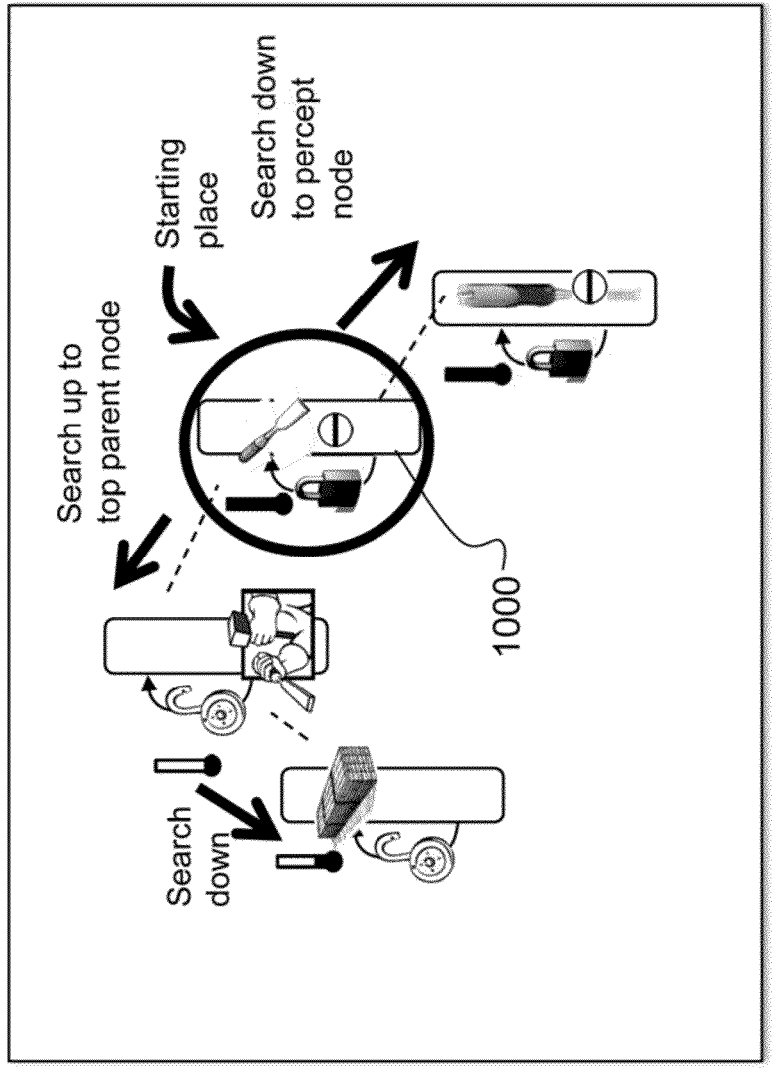
FIG. 10 an illustration of a third search for the best hypothesis according to the present invention.

FIGS. 9A, 9B, and 10 illustrate the process of finding the best hypothesis according to the present invention. In FIG. 8, several registers have the highest rating, so any of them might be chosen as the starting place for the search. In FIG. 9A, the screw 600 node of the unscrew hypothesis is most highly ranked. Then the parent link 900 and the child link 902 are traversed, adding in their utilities to a sum. Each register traversed in this search gets marked with hypothesis 1 and its utility gets added into the average for that hypothesis. FIG. 9B illustrates that the chisel node 904 is chosen because its utility is higher than the Phillips screwdriver node, as shown in FIG. 8. A later iteration will find the lower utility node for another hypothesis. As shown, in FIG. 10, a different, equally highly rated node 1000 is chosen to start the search, and nodes are marked with hypothesis 2 and their utilities (which are lower on average) are added into the average for hypothesis 2. Hypothesis 1 from FIG. 9A is the best because it has a higher average utility. It is the basis for predictions and action selection by any external system.

As shown in FIG. 3, the other portion of the utility rating comes from feedback from the environment, in terms of a reward 220 for how successful this hypothesis is for accomplishing the goals of the external system into which the inventive system described herein is embedded. As a non-limiting example, if the external system is a robot, it might now attempt the unscrew action. If the application of the hypothesis is unsuccessful, then the external world interface signals the evaluation module 206 of the failure, and the evaluation module 206 then computes the utility rating 218 then lowers it on whatever elements failed. Next, the evaluation module 206 activates the update frame links process 314 to write the new knowledge frame into the frame memory module 200 by updating utilities on existing links and, in this case, strengthening the link between chisel and screwdriver. The chisel is an analogy to the screwdriver, so the system has just learned a new way of unscrewing a screw.

The evaluation module also controls locks on each hypothesis bank register, which either protect the contents of the register or allow it to be overwritten by new values (register gating). The locking mechanism is an approach to dealing with limited hypothesis bank memory. In a desired aspect, the locking mechanism provides a dynamic threshold for locking, as a function of activation level of the register. For example, if a matching percept is found, then there is a multiplicative gain on the activation level of the lock (i.e., how locked it is). The embodiment may be related to the utility function computed by the evaluation module, which could include a leak (in time). If a higher rated frame comes in from the frame memory module, lower rated registers that are unlocked can be overwritten.

The algorithm for computing utilities as a function of reward returned by the environment is preferably implemented by a rule-based system, a neural network, or other means, as known in the art. The metric used for utility of a frame is goodness of fit to the incoming data. For instance, if 100% is a perfect match between the hypothesis in question and the situation, then 0% is a complete failure to explain the situation. The "fit" is the ability to achieve the current goal. The algorithm is trained to optimize performance based on the domain. For instance, how well does the system perform when this frame is used to control resources? Does the frame help to achieve current goals?

The scenario depicted in FIGS. 6-8 is a minimal illustration of the invention described. Any real situation could activate hundreds of knowledge frame nodes (including spurious or weakly related ones) which could, in turn, fill thousands of registers in the hypothesis bank. As illustrated in FIG. 8, a loosely related return provides the possibility of learning new ways to understand and do things.

In addition to the passive sense-making application described in the present application, the invention described herein could easily be used as an action selection mechanism controlling end-effectors that act physically through the environmental interface. Similarly, if the end-effectors control the sensors, the application could actively search for percepts in the environment that could support or disprove competing hypotheses held in the hypothesis bank. As shown in FIG. 3, percept priorities 318 coming from the hypothesis bank would be used as goal inputs to an active sensor system to track or find each percept that is part of the current highest utility hypothesis.

Figure 11:
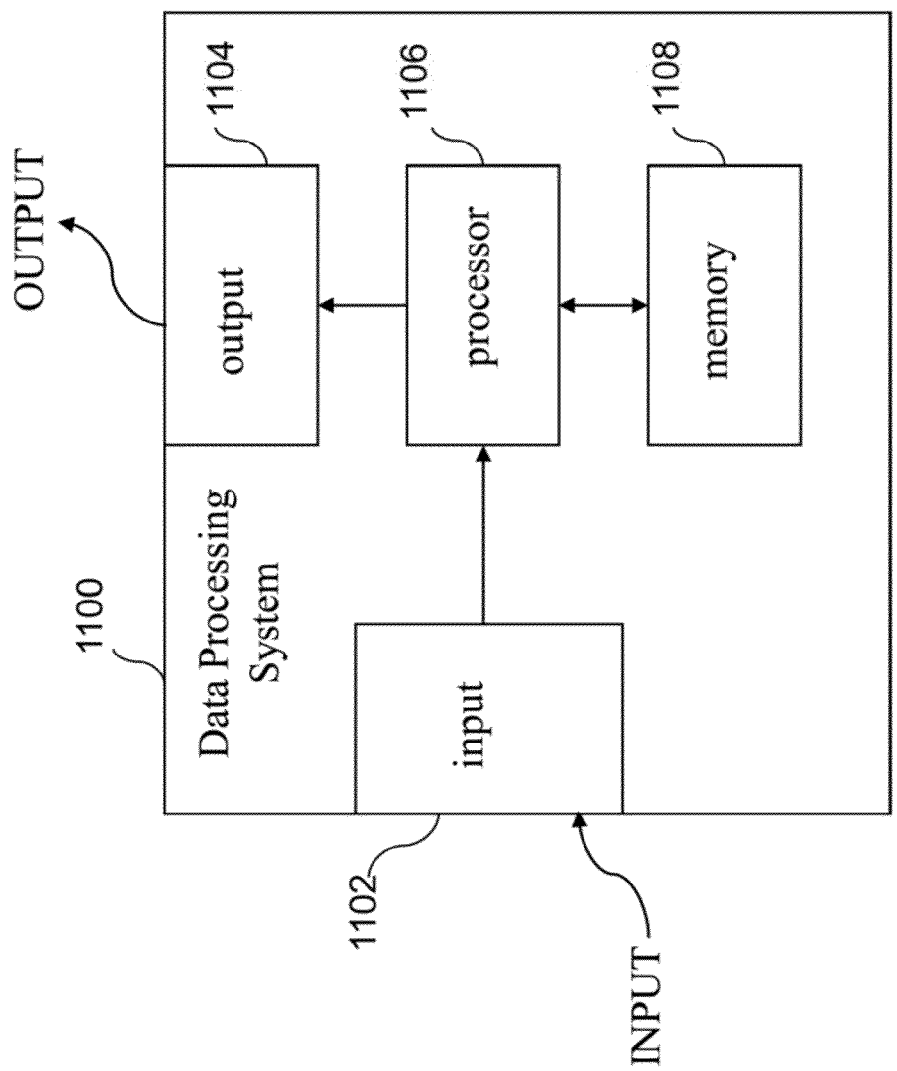
FIG. 11 is an illustration of a data processing system according to the present invention.

FIG. 11 illustrates a block diagram depicting components of a data processing system 1100 (e.g., computer) incorporating the operations of the method described above and throughout the specification. The method utilizes a data processing system 1100 for storing computer executable instructions (or instruction means) for causing a processor to carry out the operations of the above described method. The data processing system 1100 comprises an input 1102 for receiving information from a user. Information received may include input from devices such as cameras, scanners, keypads, keyboards, microphone, other peripherals such as storage devices, other programs, etc. The input 1102 may include multiple "ports." An output 1104 is connected with a processor 1106 (or processors) for providing information for transmission to other data processing systems, to storage devices, to display devices such as monitors, to generating information necessary for delivery, and to other mechanisms for presentation in user-usable forms. The input 1102 and the output 1104 are both coupled with the processor 1106, which may be a general-purpose computer processor or a specialized processor designed specifically for use with the present invention. The processor 1106 is coupled with a memory 1108 to permit storage of data and software to be manipulated by commands to the processor 1106. The memory 1108 includes instructions such that when the instructions are executed, the processor 1108 (or processors) performs operations described above and throughout the specification.

Figure 12:
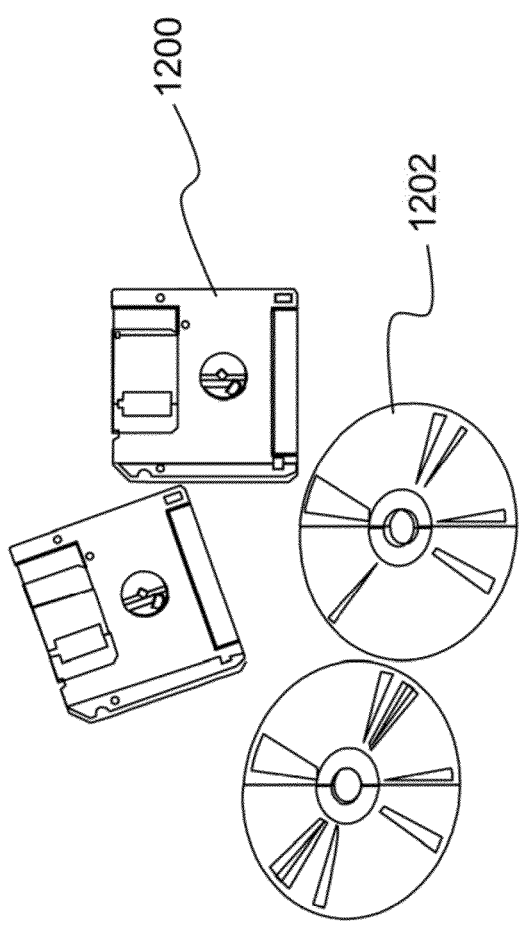
FIG. 12 is an illustration of a computer program product according to the present invention.

An illustrative diagram of a computer program product embodying the present invention is depicted in FIG. 12. As a non-limiting example, the computer program product is depicted as either a floppy disk 1200 or an optical disk 1202. However, as mentioned previously, the computer program product generally represents computer readable code (i.e., instruction means or instructions) stored on any compatible non-transitory computer readable medium.

What is claimed is:

1. A system for flexible cognitive perception and action selection, the system comprising:
   one or more processors and a non-volatile memory having instructions therein such that when the instructions are executed by the one or more processors, the one or more processors perform operations of:
      filtering and tagging of input data from an external environment by a pre-processing recognition module, resulting in at least one tagged percept;
      storing the at least one tagged percept and associating the tagged percept with at least one knowledge frame based on shared descriptors between the at least one tagged percept and the knowledge frame by a frame memory module, resulting in an activated knowledge frame;
      supplying a utility rating to each activated knowledge frame based on a set of reward values by an evaluation module;
      sorting and comparing the activated knowledge frames, and evaluating the activated knowledge frames for a goodness of fit between the utility ratings of the activated knowledge frames and the input data by a hypothesis module;
      determining, with the hypothesis module, a best hypothesis for a current situation in the external environment based on a current highest rated activated knowledge frame; and
      wherein the pre-processing recognition module performs operations of:
         extracting, and identifying a set of salient features in the input data;
         filtering the set of salient features for relevancy based on similarity to the current highest rated activated knowledge frame; and
         semantically tagging percepts.

2. The system for flexible cognitive perception and action selection as set forth in claim 1, wherein a knowledge frame in the memory module is an associative structure comprised of a set of bits that represents salient features of an experience, wherein each hit is associated with a hierarchy of semantic descriptors and related bits.

3. The system for flexible cognitive perception and action selection as set forth in claim 2, wherein the hypothesis module comprises a set of registers each containing at least one activated knowledge frame from the memory module, wherein each register has an associated utility rating.

4. The system for flexible cognitive perception and action selection as set forth in claim 3, wherein the hypothesis module further performs operations of:
   sorting the set of registers based on each register's associated utility rating; and
   re-evaluating the current highest rated activated knowledge frame when the set of registers is updated.

5. The system for flexible cognitive perception and action selection as set forth in claim 4, wherein the evaluation module further performs operations of:
receiving a set of feedback from the external environment;
determining the utility rating for each activated knowledge frame based on a reward value that is based on how successful a hypothesis is for accomplishing a goal of the system.

6. A computer-implemented method for flexible cognitive perception and action selection, comprising an act of:
causing a data processor to execute instructions stored on a non-volatile memory such that upon execution the data processor performs operation of:
filtering and tagging of input data from an external environment by a pre-processing recognition module, resulting in at least one tagged percept;
storing the at least one tagged percept and associating the tagged percept with at least one knowledge frame based on shared descriptors between the at least one tagged percept and the knowledge frame by a frame memory module, resulting in an activated knowledge frame;
supplying a utility rating to each activated knowledge frame based on a set of reward values by an evaluation module;
sorting and comparing the activated knowledge frames, and evaluating the activated knowledge frames for a goodness of fit between the utility ratings of the activated knowledge frames and the input data by a hypothesis module;
determining, with the hypothesis module, a best hypothesis for a current situation in the external environment based on a current highest rated activated knowledge frame; and
extracting and identifying a set of salient features in the input data;
filtering the set of salient features for relevancy based on similarity to the current highest rated activated knowledge frame; and
semantically tagging percepts.

7. The method for flexible cognitive perception and action selection as set forth in claim 6, wherein a knowledge frame in the memory module is an associative structure comprised of a set of bits that represents salient features of an experience, wherein each bit is associated with a hierarchy of semantic descriptors and related bits.

8. The method for flexible cognitive perception and action selection as set forth in claim 7, wherein the hypothesis module comprises a set of registers each containing at least one activated knowledge frame from the memory module, wherein each register has an associated utility rating.

9. The method for flexible cognitive perception and action selection as set forth in claim 8, further comprising acts of:
receiving a set of feedback from the external environment;
determining the utility rating for each activated, knowledge frame based on a reward value that is based on how successful a hypothesis is for accomplishing a goal of the system.

10. A computer program product for flexible cognitive perception and action selection, the computer program product comprising computer-readable instruction means stored on a non-transitory computer-readable medium that are executable by a computer having a processor for causing the processor to perform operations of:
filtering and tagging of input data from an external environment by a pre-processing recognition module, resulting in at least on tagged percept;
storing the at least one tagged percept and associating the tagged percept with at least one knowledge frame based on shared descriptors between the at least one tagged percept and the knowledge frame by a frame memory module, resulting in an activated knowledge frame;
supplying a utility rating to each activated knowledge frame based on a set of reward values by an evaluation module;
sorting and comparing the activated knowledge frames, and evaluating the activated knowledge frames for a goodness of fit between the utility ratings of the activated knowledge frames and the input data by a hypothesis module;
determining, with the hypothesis module, a best hypothesis for a current situation in the external environment based on a current highest rated activated knowledge frame; and
extracting and identifying a set of salient, features in the input data;
filtering the set of salient features for relevancy based on similarity to the current highest rated activated knowledge frame; and
semantically tagging percepts.

11. The computer program product for flexible cognitive perception and action selection as set forth in claim 10, wherein a knowledge frame in the memory module is an associative structure comprised of a set of bits that represents salient features of an experience, wherein each bit is associated with a hierarchy of semantic descriptors and related bits.

12. The computer program product for flexible cognitive perception and action selection as set forth in claim 11, wherein the hypothesis module comprises a set of registers each containing at least one activated knowledge frame from the memory module, wherein each register has an associated utility rating.

13. The computer program product for flexible cognitive perception and action selection as set forth in claim 12, further comprising instruction means for causing the processor to perform operations of:
receiving a set of feedback from the external environment;
determining, the utility rating for each activated knowledge frame based on a reward value that is based on how successful a hypothesis is for accomplishing, a goal of the system.

* * * * *